United States Patent
Aizawa (10) Patent No.: US 6,362,814 B1
(45) Date of Patent: Mar. 26, 2002

(54) ELECTRONIC APPARATUS

(75) Inventor: Masatoshi Aizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/404,601

(22) Filed: Sep. 24, 1999

(30) Foreign Application Priority Data

Oct. 2, 1998 (JP) .......................................... 10-281032

(51) Int. Cl.$^7$ ................................................. G09G 5/00
(52) U.S. Cl. ........................ 345/169; 345/184; 379/354
(58) Field of Search ................................ 345/157, 169, 345/184, 121, 123; 455/564, 566, 575; 341/22; 379/354–356; 340/825.44

(56) References Cited

U.S. PATENT DOCUMENTS 5,677,949 A * 10/1997 Macor ........................ 379/354

FOREIGN PATENT DOCUMENTS

EP     0679003    * 10/1995

* cited by examiner

*Primary Examiner*—Regina Liang
(74) *Attorney, Agent, or Firm*—Jay H. Maioli (57) ABSTRACT

An electronic apparatus, such as a pager system, has an improved user interface, in which in a message list mode, an LCD displays messages in units of one line, wherein turning a dial of a jog dial allows a cursor to move vertically, and pushing the dial allows the mode to shift to a message display mode. In the message display mode, the LCD displays one screen of the message on which the cursor is set when the dial is pushed, turning the dial allows contents of the display to scroll, and pushing the dial allows the mode to shift to a message scan mode. In the message scan mode, turning the dial allows contents of the display on the LCD to shift to one of the messages preceding and following the current message in units of one screen.

3 Claims, 8 Drawing Sheets

Please call me later. This is James from SONY Corporation.

FIG. 6B (PRIOR ART)

Later. This is James from SONY Corporation.
I want to change my

FIG. 6C (PRIOR ART)

from SONY Corporation.
I want to change my E-mail address.

FIG. 9

ELECTRONIC APPARATUS

BACKGROUND OF THE INVENTION

1. Field of the Invention

The present invention relates to an electronic apparatus such as a pager system.

2. Description of the Related Art

With pager systems, when a caller (calling source) carries out predetermined operations, the caller can contact a remote pager system (source to be called), and in addition, can send messages to the remote pager.

Most pager systems have a display screen with a display capacity of about 4 lines of 20 characters. With these pager systems, a procedure described below is performed to select a message from multiple messages received and stored and to display the selected message on the screen.

Figure 5A:
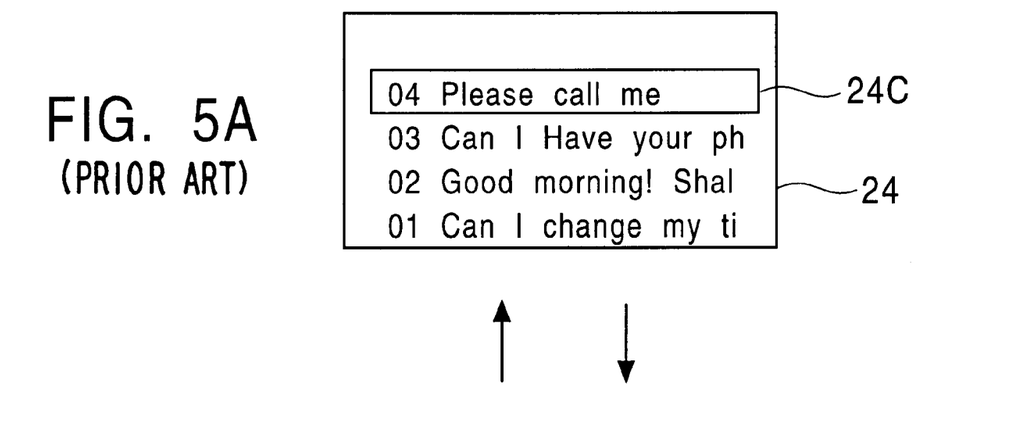
FIGS. 5A to 5C are plan views of example display screens according to the present invention.
Figure 5B:
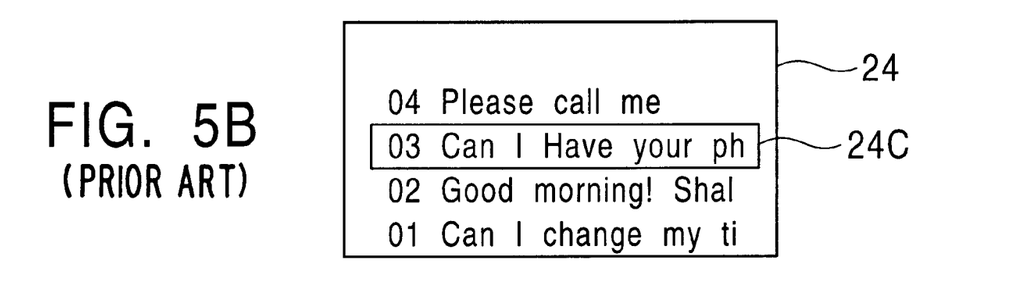
Figure 5C:
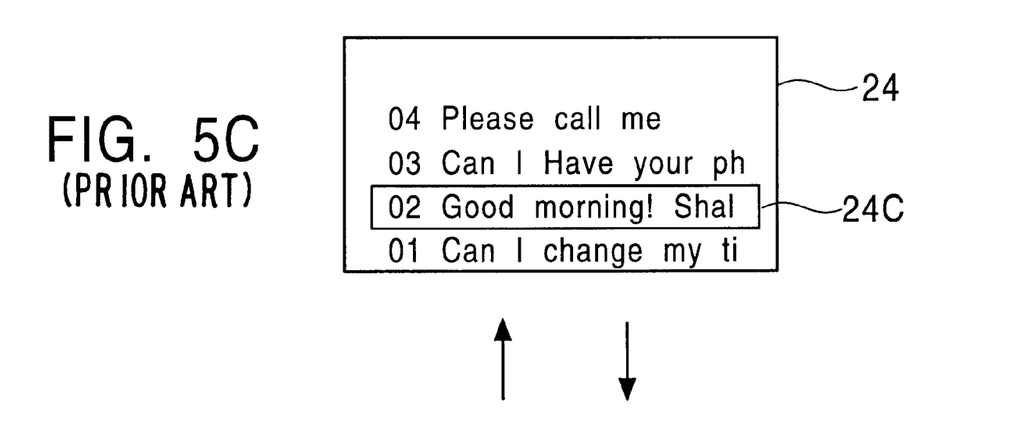
Figure 6A:
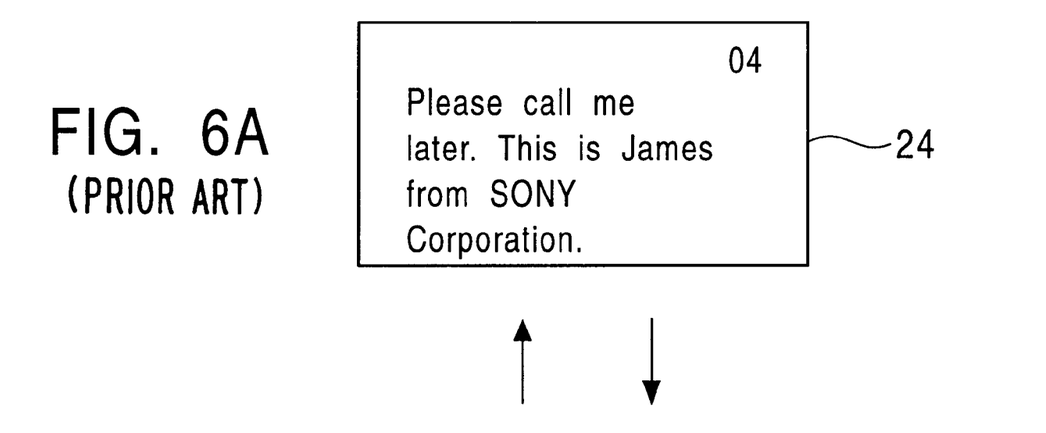
FIGS. 6A to 6C are plan views of example display screens according to the present invention.
Figure 6B:
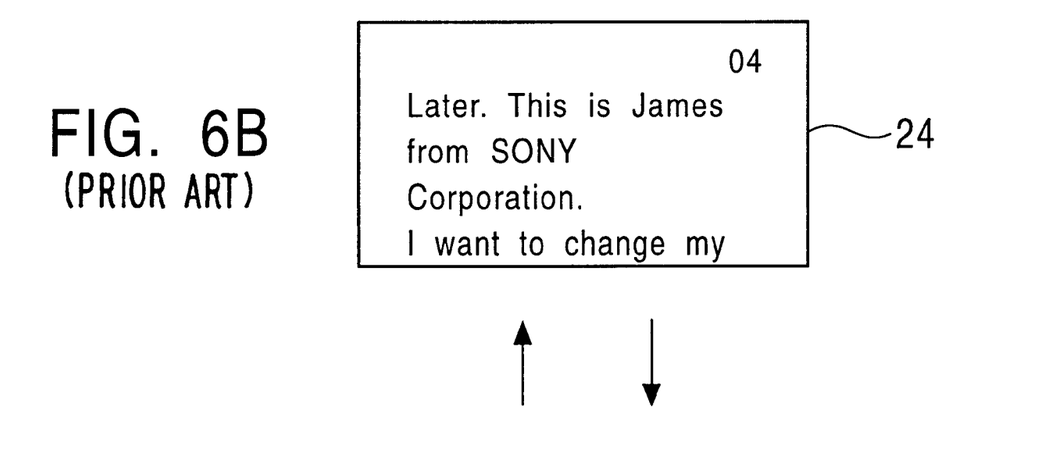
Figure 6C:
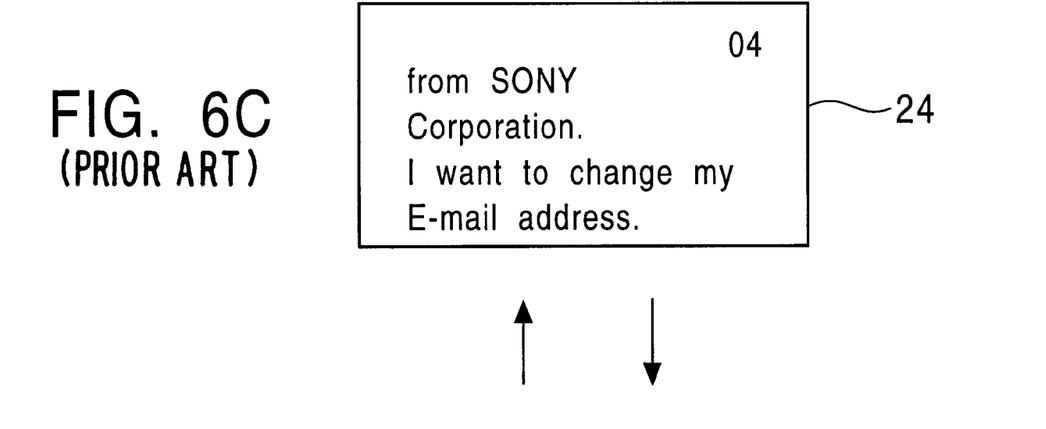

Shifting the mode of the pager system from a wait mode to a display mode causes a "message list mode" to be displayed, as shown in FIGS. 5A to 5C. Then, the "message list mode" lists the beginning parts of individual messages line by line on the screen. When a cursor is vertically moved using up and down keys, and a determination key is pushed, a "message display mode" appears. The "message display mode" then displays, as shown in FIGS. 6A to 6C for example, one screen of the message (four lines) on which the cursor is set when the determination key was pushed. For a message displayed thereon which is longer than the capacity of one screen, the up and down keys are used to vertically scroll the message, thereby allowing the entire message to be read.

Figure 7A:
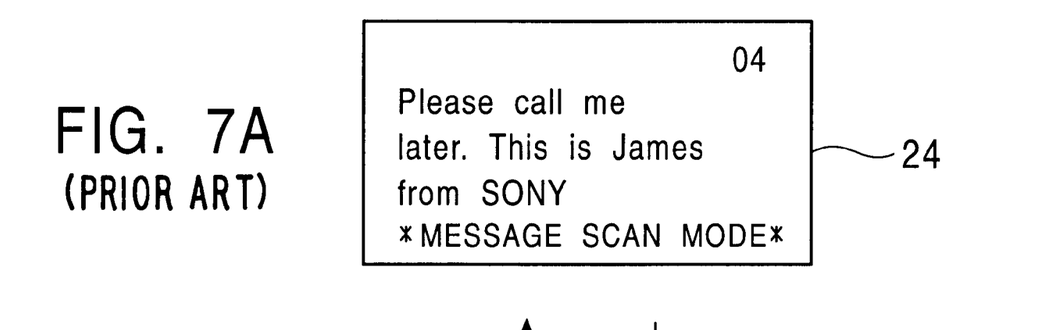
FIGS. 7A to 7C are plan views of example display screens according to the present invention.
Figure 7B:
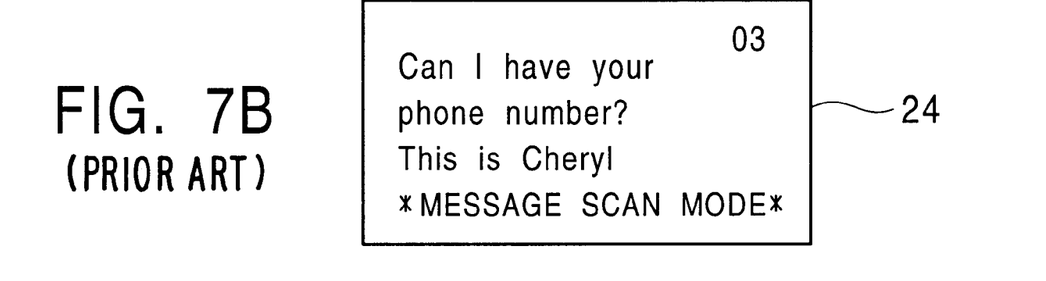
Figure 7C:
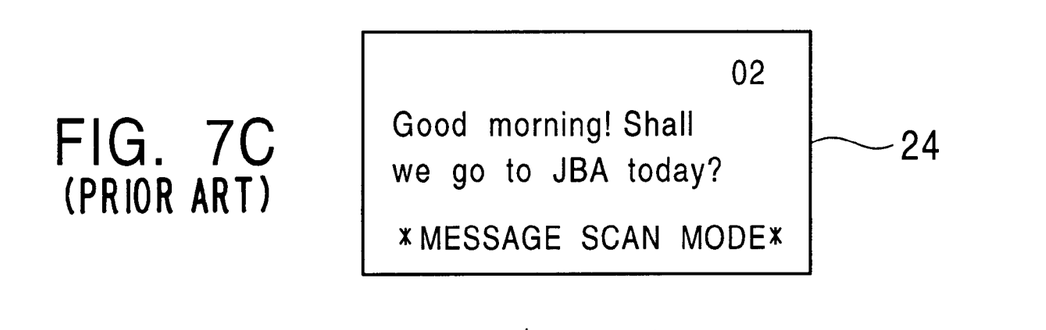

Pushing left and right keys in the "message display mode", as shown in FIGS. 6A to 6C, allows the mode to shift to a "message scan mode". In this mode, each push of the left and right keys allows the displayed message to shift to the vertically adjacent message, as shown in FIGS. 7A to 7C. In this case, the beginning part of the message for one screen is displayed.

The message list mode in FIGS. 5A to 5C displays only about 18 characters in the beginning part of the message, therefore, depending on the case, making it difficult to identify a desired message. However, the "message scan mode" in FIGS. 7A to 7C displays a considerably larger number of characters, thereby allowing a desired message to be easily identified. Nevertheless, as described above, the "message list mode" as shown in FIGS. 5A to 5C requires use of up and down keys for message selection, and the "message scan mode" in FIGS. 7A to 7C requires use of the left and right keys for switching of the message display. In this way, different keys are used for the message-selecting operation This is not preferable in a user-interface.

Also, the abovementioned apparatus uses as many as six operation keys in total, that is, two keys as the up and down keys, two keys as the left and right keys, one determination key, and one canceling key or return key (not shown). Therefore, these six keys must be provided even in miniaturized pager systems.

SUMMARY OF THE INVENTION

In view of the above, an object of the present invention is to solve the problems described above. To solve the problems, the invention provides an electronic apparatus as described below.

According to one aspect of the invention, the electronic apparatus includes a first operating device having a turnable operating section that can be pushed toward the rotation center and a display device for displaying textual information. With this electronic apparatus, in a first display mode, one line each of at least one piece of the textual information is displayed in a list on the display device, turning the operation section allows a cursor set on a piece of the textual information in the list of at least one piece of the textual information to vertically move or allows the list of at least one piece of the textual information to vertically scroll, and pushing the operation section in the first display mode allows mode-shift to the second display mode.

In a second display mode, the display device to display one screen of at least one piece of the textual information on which the cursor was set when the operation section was pushed in the first display mode, pushing the operation section allows contents of display on the display device to scroll vertically, and pushing the operation section in the second display mode allows mode-shift to the third display mode.

In a third display mode, turning the operation section allows the contents of display on the display device to shift to the textual information preceding or following the current textual information in units of one screen.

In the above case, when the operation section is pushed in the second display mode in a different manner from that in which the operation section was pushed for performing mode-shift from the second display mode to the third display mode, the mode may be shifted to a fourth display mode; and in the fourth display mode, turning and/or pushing the operation section may causes a predetermined process to be performed for the textual information displayed on the display device.

Also, the electronic apparatus described above may further include a second operation device, in which operating the second operation device in the second display mode allows the second display mode to shift back to the first display mode, and operating the second operation device in the third display mode allows the third display mode to shift back to the second display mode.

In the above, the second operation device may be made of a key switch.

Also, the electronic apparatus described above may further include a second operation device, in which operating the second operation device in the second display mode allows the second display mode to shift back to the first display mode; and operating the second operation device in the third display mode and the fourth display mode allows the third display mode and the fourth display mode to shift back to the second display mode.

In the above case also, the second operation device may be made of a key switch.

According to another aspect of the invention, an electronic apparatus includes a first directional key, a second directional key, a first operation key, and a display device for displaying character strings. With this electronic apparatus, in a first display mode, one line each of at least one character string is displayed in a list on the display device, turning one of the first directional key and the second directional key allows a cursor set on a character string in the list of at least one character string to move in one of first direction and second direction or allows the list of at least one character string to scroll in one of the first direction and the second direction, and pushing the first operation key in the first display mode allows mode-shift to the second display mode. In a second display mode, the display device displays one screen of at least one character string on which the cursor was set when the operation section was pushed in the first display mode, operating one of the first directional key and the second directional key allows contents of display on the display device in one of the first direction and the second direction, and operating the first operation key in the second display mode allows mode-shift to the third display mode. In a third display mode, operating one of the first directional key and the second directional key allows the contents of display on the display device to shift to the character string preceding or following the current character string in units of one screen for each operation.

In the above case, when the first operation key is operated in the second display mode in a different manner from that in which the first operation key was operated for performing mode-shift from the second display mode to the third display mode, the mode may be shifted to a fourth display mode.

Also, the electronic apparatus described above may further include a second operation key, in which operating the second operation key in the second display mode allows the second display mode to shift back to the first display mode; and operating the second operation key in the third display mode allows the third display mode to shift back to the second display mode.

Furthermore, the electronic apparatus described above may further include a second operation key, in which operating the second operation key in the second display mode allows the second display mode to shift back to the first display mode; and operating the second operation key in the third display mode and the fourth display mode allows the current mode to shift back to the second display mode.

The present invention provides advantages including those described below.

The present invention provides a consistent operation method for the dial and key, thereby allowing the operation to be easily performed. Also, the invention uses only two operation device, that is, the dial and the key. This is an advantage in miniaturization of the pager system. In addition, the invention can be operated by one hand.

Furthermore, the invention dose not force novice users to learn what are not required for practical operations, therefore preventing confusion. Still furthermore, the invention allows high-level users to easily use high-level functions. That is, the invention can provide user interfaces appropriate to the skill levels of users.

DESCRIPTION OF THE PREFERRED EMBODIMENTS

Figure 1:
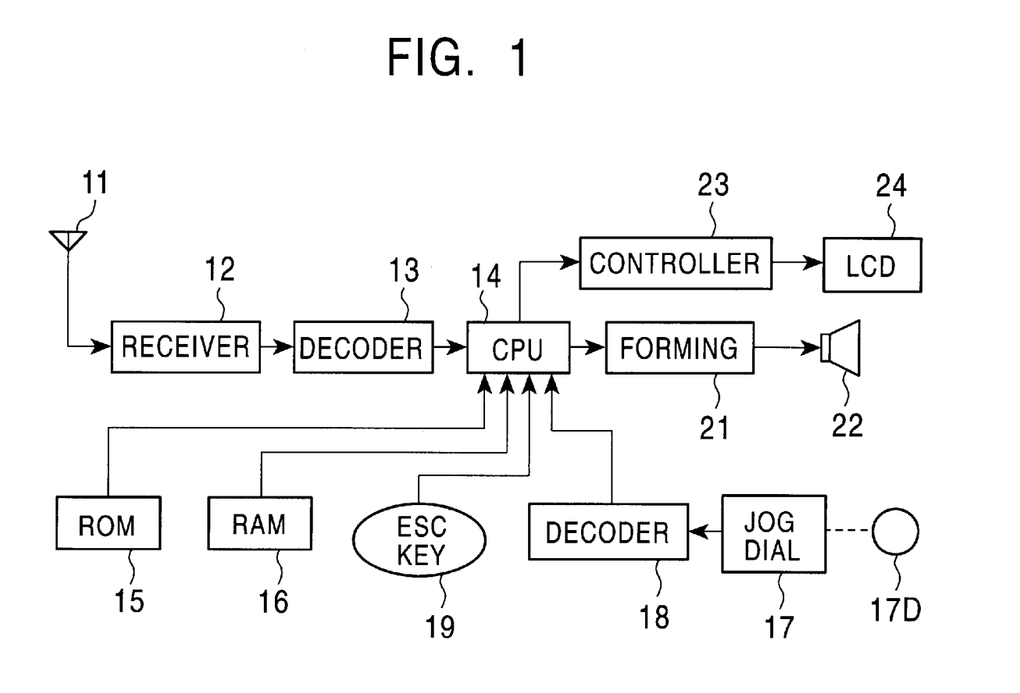
FIG. 1 is a schematic view of a system according to the present invention.

FIG. 1 shows an embodiment of a pager system according to the present invention. Signals sent from a center (pager base station) for the pager system are received by an antenna 11 and are then fed to a receiver circuit 12. The receiver circuit 12 is configured as a superhetrodyne receiver (not shown) that includes elements ranging from an antenna-input circuit to a demodulator circuit. An output from the demodulator circuit is then fed to a decoder circuit 13, in which data for the pager system is retrieved. The retrieved data is then fed to a CPU 14.

The CPU 14 is connected to a ROM 15 and a RAM 16. The ROM 15 contains various processing programs and data, including programs shown in FIG. 4 for implementing screen transition and data (identification codes) specific to businesses and terminals. The RAM 16 has work areas including receiving and storing areas for storing received message data, with a capacity for storing, for example, the data for 40 messages.

The CPU 14 is also connected to a jog dial 17 via a decoder circuit 18. The jog dial 17 is made of a rotary encoder and includes a disc dial 17D as an inputting section The disc dial 17D can be turned clockwise and counter-clockwise for each click and can also be pushed in the rotation center direction. These operations of the disc dial 17D allow the decoder circuit 18 to output signals representing the operations, and the signals are fed to the CPU 14.

The CPU 14 is also connected to an escape (ESC) key (return key) 19 made of a non-locking push switch. Pushing the escape key 19 produces an output so as to be fed to the CPU 14. The CPU 14 is also connected to a sound-calling-signal-forming circuit 21 connected to a speaker 22.

Figure 2:
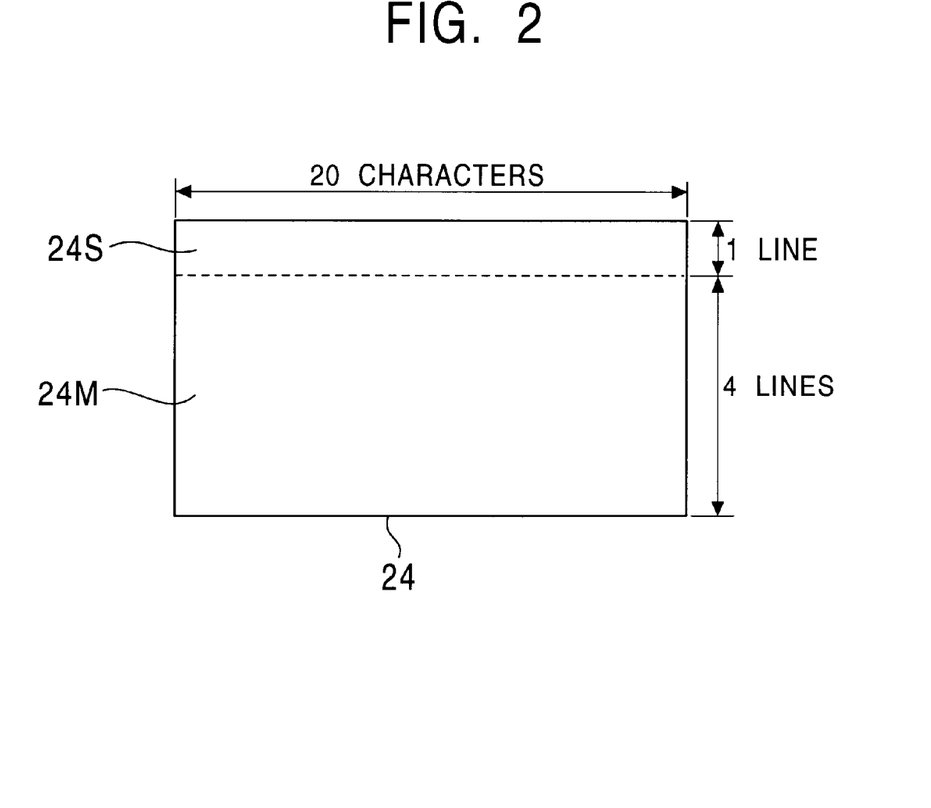
FIG. 2 is a plan view of a display screen according to the present invention.

The CPU 14 is also connected to a display panel, for example, an LCD 24, via a display control circuit 23. The LCD 24 includes a main display region 24M and a supporting display region 24S, as shown in FIG. 2 for example. The main display region 24M has a capacity to display dot-matrix characters up to, for example, 4 lines of 20 characters. The supporting display region 24S is arranged so as to display, for example, page numbers.

Message data stored in the RAM 16 is displayed in the following manner. The message data is read by the CPU 14 and is fed to the display control circuit 23. The data fed to the display control circuit 23 is then converted to display signals, and the display signals are fed to the LCD 24. Thus, message contents corresponding to the data read out from the RAM 16 are displayed on the LCD 24.

Figure 3:
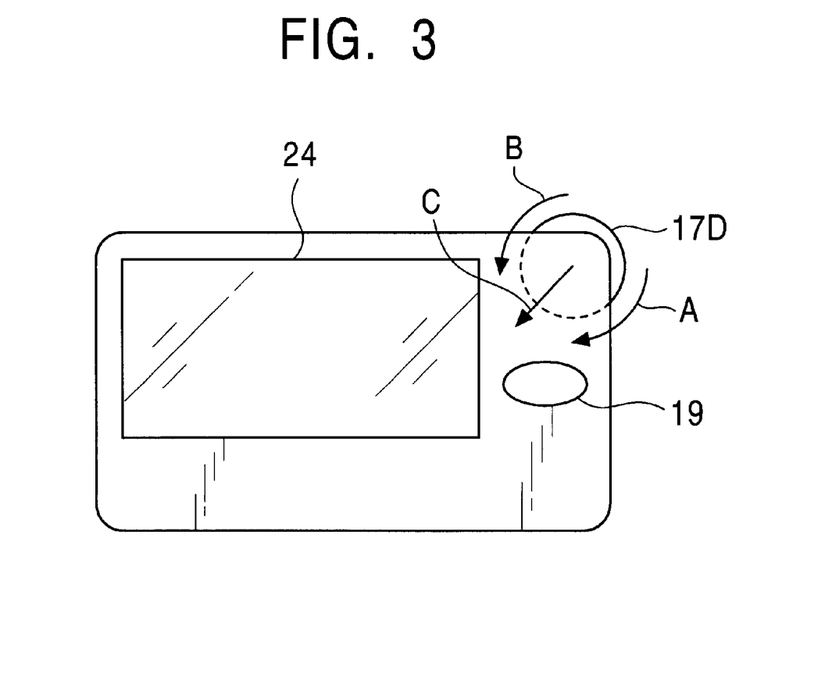
FIG. 3 is a plan view of an embodiment according to the present invention.

FIG. 3 is a plan view of an example appearance of the pager system described above. The pager system is of a parallelepiped rectangular shape, about the standard calling card overall The LCD 24 is provided on a front part of the box body; the escape key 19 is provided on the right side thereof; and the disc dial 17D of the jog dial 17 is inserted in the right-upper corner thereof. In this case, as described above, the disc dial 17D is arranged so as to be turnable clockwise (in the direction arrow A points) and counter-clockwise (in the direction arrow B points) and so as to be pushable in the rotation center direction (as arrow C points).

In the above configuration, when a caller makes a call using a telephone, the center sends FSK signals carrying an identification code recognized from the call in response. The code is then outputted from the decoder circuit 13. The outputted code is then compared to the identification code of the caller which is stored in the ROM 15. When the two codes match, that is, when a transmission is confirmed to be addressed to the caller, the call-sound-signal-forming circuit 21 is permitted to emit the call-sound signal. The call-sound signal is then fed to the speaker 22, the call results in an alerting sound being emitted.

Figure 4:
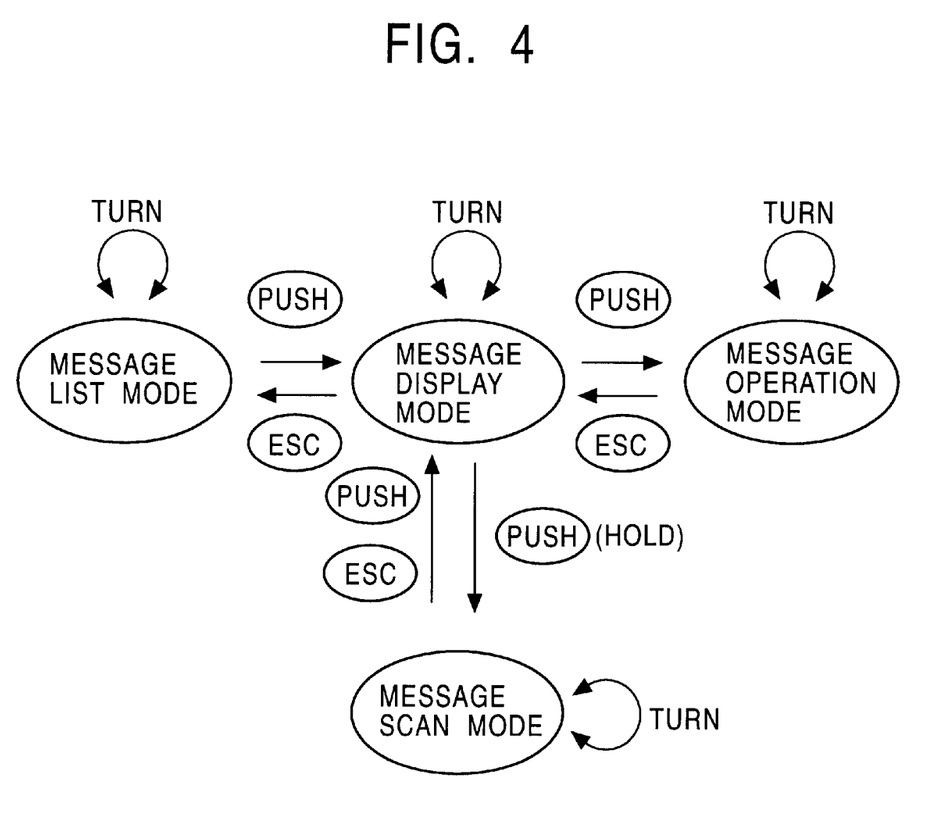
FIG. 4 shows transition of display screens according to the present invention.

When identification code and message data are transmitted together, the message data is stored in the RAM 16, and the message data can be retrieved from the decoder circuit 13. With the RAM 16 containing message data, operations of the disc dial 17D of the jog dial 17 or the escape key 19 cause the display on the LCD 24 to shift as shown in FIG. 4, thereby allowing the messages to be displayed. That is, when the dial 17D of the jog dial 17 is pushed in a wait mode of the pager system, the push operation is recognized by the CPU 14 via the decoder circuit 18, and the pager system shifts the mode to a displaying mode, and the display on the LCD 24 shifts, as shown in FIGS. 5A to 5C for example, to a "message list mode".

Message List Mode

In the "message list mode", the beginning parts of the individual messages received and stored in the RAM 16 are listed in units of one line in the main display region 24M of the LCD 24. The messages are listed down in the order from the latest reception with serial numbers prefixed in the order from the oldest. Since the display capacity of the LCD 24 is restricted to four lines per screen, when five or more messages are received and stored, only four messages are displayed in the order from the latest reception. In this case, as shown in FIG. 5A, the first message is displayed with the cursor 24C in a reversed video (the cursor 24C is shown as a frame in FIGS. 5 to 9 for the sake of drawing).

In the state shown in FIG. 5A, for example, turning the dial 17D clockwise by one click allows the cursor (in the reversed video) 24C to move down by one line of the message. In the state shown in FIG. 5B, further turning the dial 17D clockwise by one click allows the cursor 24C to move down by one more line of the message.

In this way, in the "message list mode", turning the dial 17D clockwise allows the cursor 24C to move down in units of one line per click in the order as shown in FIGS. 5A→5B→5C. When five or more messages are received and stored, when the cursor 24C moves down onto the bottom line in each screen, the display of the beginning parts of the messages is scrolled up in units of one line. When the cursor 24C moves down onto the last line of the messages (the oldest message), no further change occurs for the cursor 24C and scrolling.

Also, turning the dial 17D counterclockwise in the "message list mode" allows the cursor 24C to move up in the message unit per click as shown in FIGS. 5C→5B→5A.

With five or more messages being received and stored, when the cursor 24C moves up onto the top line in each screen, the display of the beginning parts of the messages is scrolled up in units of one line. When the cursor 24C moves up onto the first line of the messages (the latest message), no further change occurs for the cursor 24C and scrolling.

In the above example, as shown in FIGS. 5A to 5C, the cursor 24C moves vertically in response to operations of the dial 17*d*. However, the position of the cursor 24C may be arranged so as not to change, and the position of the displayed message may be arranged so as to vertically move.

As described above, the "message list mode" allows the the beginning parts of the individual messages to be listed in units of one line, and one of the messages on which the cursor 24C is set is assumed to be a desired message for full displayed. In this way, the "message list mode" allows desired messages to be retrieved.

When the cursor 24C stays on a desired message, and the dial 17D is pushed in the direction arrow C points, the display of the LCD 24 shifts to, for example, a "message display mode" shown in FIGS. 6A to 6C. Also, in the "message list mode", pushing the escape key 19 allows the pager system to shift the mode from the displaying mode to the wait mode.

Message Display Mode

In the state shown in FIG. 5A, for example, when the dial 17D is pushed, four lines of the fourth message on which the cursor 24C is set are displayed in the main display region 24M. In the supporting display region 24S, for example, the serial number "04" is displayed.

Specifically, pushing the dial 17D in the "message list mode" causes mode-shift to the "message display mode". Then, the message on which the cursor 24C was set in the "message list mode" is selected, and the beginning part of the selected message is displayed on one screen. In this case, the serial number of the selected message is also displayed.

In the state shown in FIG. 6A, when the dial 17D is turned clockwise by one click, one line of the message is scrolled up, as shown in FIG. 6B. When the dial 17D is further turned clockwise by one click in the state shown in FIG. 6B, one more line of the message is scrolled up, as shown in FIG. 6C. That is, in the "message display mode", turning the dial 17D clockwise allows the messages to be scrolled up in units of one line per click in the order as shown in FIGS. 6A→6B→6C. On the other hand, when the dial 17D is turned counterclockwise, the messages are scrolled down in units of one line per click in the order as shown in FIGS. 6C→6B→6A. In this way, in the "message display mode", the messages are vertically scrolled by turning the dial 17D clockwise and counterclockwise. Therefore, even a message of five or more lines can be read.

In the "message display mode", pushing the escape key 19 causes the mode to shift back to the "message list mode" shown in FIGS. 5A to 5C. Therefore, this function can be used to re-retrieve a desired message in the "message list mode" even when undesired message was displayed by an erroneous operation or the like in the "message display mode".

Also, in the "message display mode", pushing the dial 17D in the direction the arrow C points for two seconds or longer, for example, allows the display of the LCD 24 to shift to a "message scan mode".

Message Scan Mode

In the "message display mode", when the dial 17D is pushed for two seconds or longer, for example, the display shifts to the "message scan mode". In this mode, a region of the upper three lines in the main display region 24M displays first three lines of a message. The message displayed therein had been displayed in the immediately previous mode, that is, "message display mode". Also, in a region of the bottom line in the main display region 24M, a character string "* MESSAGE SCAN MODE *" is displayed for mode identification of the pager system. Also, in the supporting display region 24S, the message serial number, for example, "04" is displayed.

In a state as shown in FIG. 7A, for example, when the dial 17D is turned clockwise by one lick, the message immediately preceding the message that was displayed is displayed with the serial number, similarly to as the above When the dial 17D is further turned clockwise by one click in the state shown in FIG. 7B, the message before the preceding message is displayed with the serial number, similarly to the above.

As described above, in the "message scan mode", turning the dial 17D clockwise allows the message to be switched to the one-message-preceding (older) message per click, that is, in the order FIGS. 7A→7B→7C. In contrast, when the dial 17D is turned counterclockwise, the message is switched to one-message-subsequent (newer) message on the basis of one message per click. In this way, in the "message scan mode", the displayed message is switched to older or newer messages in the message unit in response to operations of turning the dial 17D clockwise and counter-clockwise. In addition, the first three lines of the message are displayed. Therefore, the "message scan mode" allows a desired message to be easily retrieved.

In the "message scan mode", when the escape key 19 (or dial 17D) is pushed, the display shifts back to the "message display mode", and concurrently, the message which was displayed in the immediately preceding "message scan mode" is displayed again. In this way, in the "message scan mode", when messages are scanned and a desired message is detected, pushing the escape key 19 (or the dial 17D) allows reading of even the entire message requiring a display region larger than the screen size.

Message Operation Mode

Figure 8A:
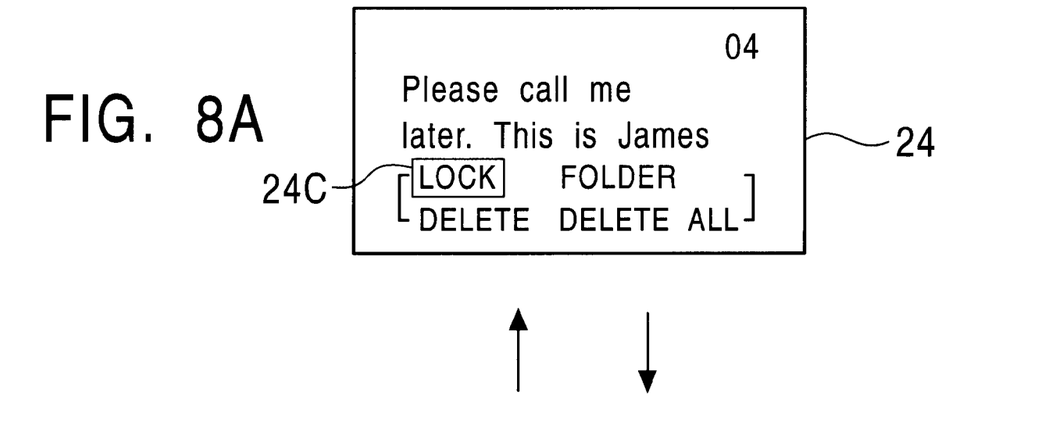
FIGS. 8A to 8C are plan views of example display screens according to the present invention.
Figure 8B:
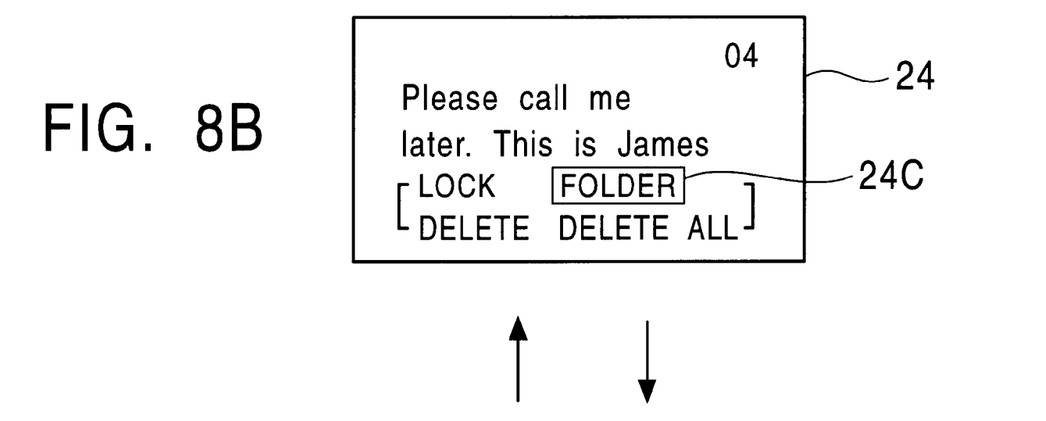
Figure 8C:
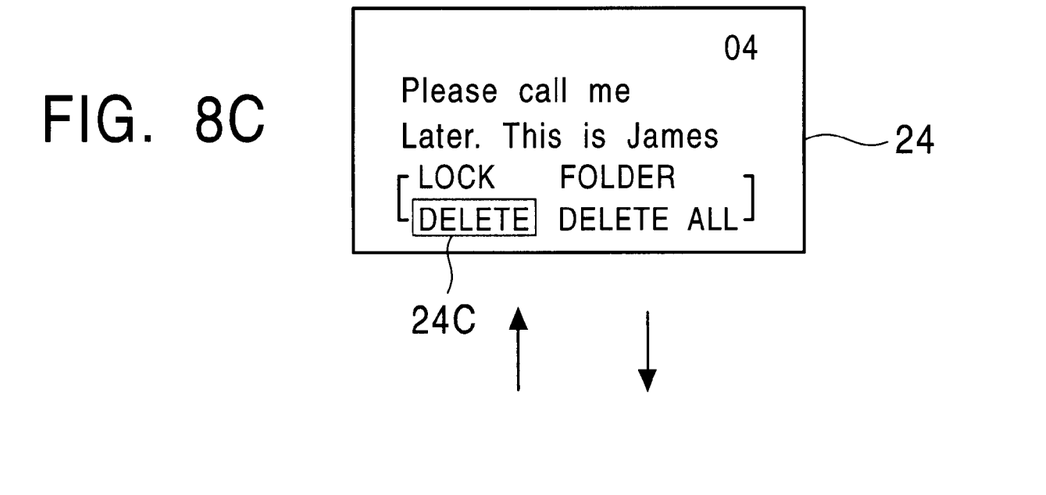

The "message operation mode" displays, for example, the screen shown in FIG. 8. This screen is used to perform the following functions for message data stored in the RAM 16.
(1) Function for locking and unlocking a data deleting function This function locks and unlocks a function for deleting the oldest data to be performed automatically when a received-mail-storage area of the RAM 16 is full of data.
(2) Function for storing (grouping) messages in folders This function transfers messages from the received-mail-storage area to a different area.
(3) Function for deleting a single message This function deletes a specified single message from the received-mail-storage area.
(4) A function for deleting all messages This function deletes all messages from the received-mail-storage area.

In the "message display mode", as shown in FIGS. 6A to 6C, where a message is displayed, pushing the dial 17D causes the LCD 24 to display, for example, the "message operation mode" shown in FIG. 8A. In the "message operation mode", a region of the upper two lines in the main display region 24M displays first two lines of a message. The message displayed therein had been displayed in the immediately preceding "message display mode". Also, in a region of the lower two lines in the main display region 24M, submenus "LOCK", "FOLDER", "DELETE", and "DELETE ALL" are displayed. The respective submenus represent the above functions (1), (2), (3), and (4), in which the first menu "LOCK" is displayed in reverse, and thereby, the cursor 24C is displayed.

When the dial 17D is turned clockwise by one click, as shown in FIG. 8B, the cursor 24C moves to the next menu "FOLDER", and thereafter, cycles the subsequent menus in response to clockwise turning of the dial 17D for each click. In contrast, when the dial 17D is turned counterclockwise, the cursor 24C cycles back to the individual menus in the reverse direction for each click.

When the dial 17D is pushed when the cursor 24C is set on a desired menu, the LCD 24 displays contents of the desired menu, in which the desired process is ready to be executed.

Also, in the "message operation mode" shown in FIG. 8, when the escape key 19 is pushed, the display shifts back to the "message display mode" as shown in FIG. 6. In this way, when a mode such as the "message display mode" is displayed to select a desired message, and then the "message operation mode" is displayed, the functions (1) to (4) described above can be executed for the desired message.

According to the procedure described above, the pager system in FIG. 1 is not just capable of displaying received messages. With this pager system, however, as shown in FIG. 4, the display modes are switched by using the dial 17D and the escape key 19, and messages and scrolling in all the display modes are switched by using the dial 17D. In this way, the operation method is consistent. This consistency allows the pager system operations to be easily performed, and are preferable in view of the user interface.

In addition, only the "message list mode" and the "message display mode" are sufficient entry modes for retrieval and full display of a desired message. Also, when the dial 17D is pushed for a long time in the "message display mode", the pager system shifts to the "message scan mode" in which retrieval of a desired message can be even easier. That is, the present invention described above provides basic functions for retrieving the desired message through the "message list mode" and the "message display mode", but also provides high-level functions for the message retrieval through the "message scan mode".

With the pager system described above, even novice users can retrieve a desired message by using only the basic functions. In addition, high-level functions are transparent in view of the basic functions. This prevents novice users from being forced to learn unnecessary skills for their intended operations, therefore preventing confusion. Nevertheless, the high-level functions can be easily used by novice users. That is, user interfaces corresponding to skill levels of the novice users can be provided.

In addition, even when a novice user mistakenly shifts the pager system to the "message scan mode", the user can easily escape from the mode by merely pushing either the escape key 19 or the dial 17D.

In addition, only the two operation means, that is, the dial 17D and the escape key 19, are used for operation. This is advantageous in miniaturization of the pager system. Also, when the pager system is held, for example, in the right hand, the dial 17D can be operated by the forefinger, and the escape key 19 can be operated by the thumb. Therefore, one-hand operation allow desired messages to be retrieved and read.

In the United States, for example, pager systems are used for distribution services for news, weather forecasts, and the like. To enable the present invention to perform services equivalent to the above, operations described below are performed.

Figure 9:
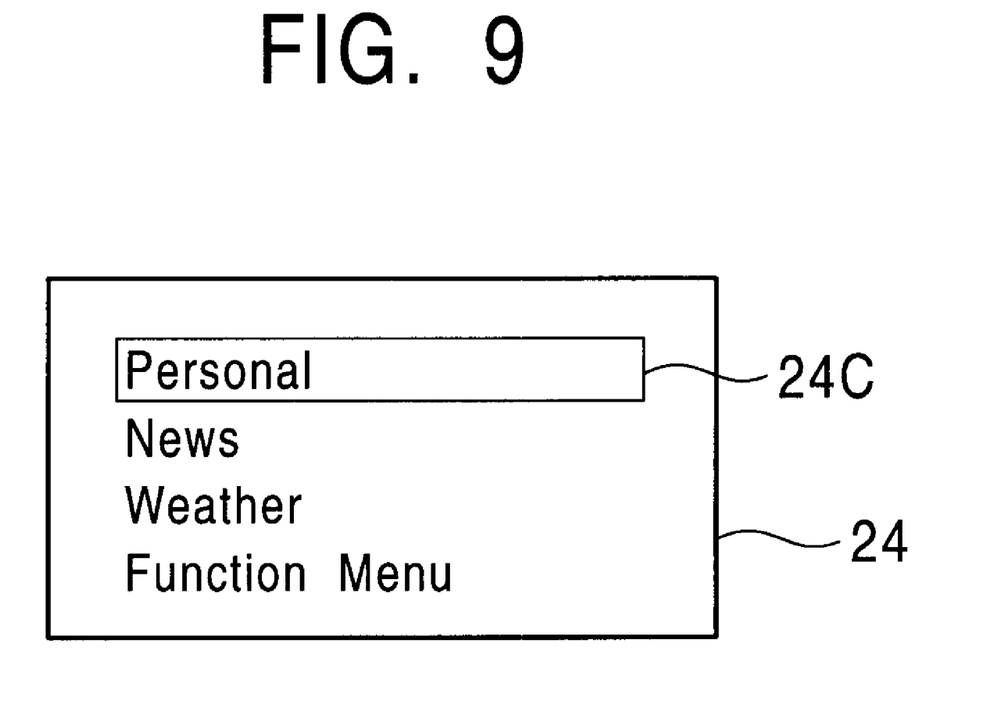
FIG. 9 is a plan view of an example display screen according to the present invention.

With the pager system in the wait mode, when the dial 17D is pushed, the CPU 14 recognizes the pushed entry via the decoder circuit 18. The pager system then shifts the mode to the display mode, and the display on the LCD 24 shifts to a "menu mode" as shown in FIG. 9. The "menu mode" provides the following menus and functions:

Personal: Provides the above pager functions.
News: Displays distributed news.
Weather: Displays distributed weather forecasts.
Function Menu: Shifts to defined modes of various functions.

Immediately after the display shifts to the "menu mode", the cursor 24C appears in the first line.

Consecutively, when the dial 17D is turned clockwise or counterclockwise, the cursor 24C moves down or up on the menus one by one (line by line) for each click as in the case of the "message list mode" in FIG. 5. When the cursor 24C is set on a desired menu and the dial 17D is pushed, the pager system shifts to the mode of the menu item on which the cursor 24C was set, thereby allowing individual functions to be executable.

For example, as shown in FIG. 9, with the cursor 24C being set on "Personal", pushing the dial 17D allows the mode to the abovementioned pager function mode with the display on the LCD 24 which has shifted to the "message list mode" shown in FIG. 5A. Thereafter, in the manner described above, messages can be read. Also, when the escape key 19 is pushed in the "message list mode" in FIG. 5, the pager system shifts the mode back to the "menu mode" in FIG. 9, thereby allowing other menu items to be selected.

Also, when the escape key 19 is pushed in the "message list mode", the pager system shifts from the displaying mode to the wait mode and waits for message-data transmission from the center.

In this way, the pager system can respond to the distribution services for the news, weather forecasts, and the like. In addition, basic operations for the dial 17D and the escape key 19 are the same as in the case of the above pager system.

According to the above, when the dial 17D is pushed for a long time in the "message display mode", the pager system shifts the mode to the "message scan mode". However, the pager system may be arranged so as to shift the mode to the "message scan mode" in response to two consecutive pushes of the dial 17D in a short time (double-clicks) in the "message display mode".

Also, the jog dial is not restricted to the disc dial, and it may be a columnar turnable operation shaft. Also, the jog dial 17 may be an operation key (operation switch) that turns the dial 17D clockwise and counterclockwise when it is pushed. Also, the above describes the case where the present invention is applied to a pager system, however, the present invention may be applied to any other electronic apparatus in which hierarchical selection of displayed specified data is necessary, such as personal handy-phone systems (PHSs), electronic notebooks, and electronic phone directories.

While the invention has been illustrated and described in detail with reference to preferred embodiments, it will be understood that the invention is not restricted thereto, but various other modifications may be incorporated therein without departing from the spirit and scope of the invention.

What is claimed is:

1. An electronic apparatus comprising:

operation means having a turnable operation section arranged to be pushed toward a turning center of the operation section, display means for displaying textual information, and control means responsive to said operation means and controlling said display means, wherein in a first display mode, one line each of at least one piece of the textual information is displayed in a list on the display means, turning the operation section allows a cursor set one a piece of textual information in the list of at least on piece of the textual information to vertically move or allows the list of at least one piece of the textual information to scroll vertically, and pushing the operation section in the first display mode allows mode-shift to a second display mode, wherein in the second display mode, the display means is controlled to display one screen of at least one piece of the textual information on which the cursor was at when the operation section was pushed in the first display mode, pushing the operation section causes contents of display on the display means to scroll vertically, and pushing the operation section in the second display mode causes a mode-shift to a third display mode, and in the third display mode, turning the operation section causes the contents of display on the display means to shift to the textual information preceding or following the current textual information in units of one screen, and wherein said operation means comprises a first operation means forming said turnable control section and a second operation means, wherein when the first operation means is pushed in the second display mode in a different manner from that in which the first operation means was pushed for performing the mode-shift from the second display mode to the third display mode, the mode shifts to a fourth display mode, and in the fourth display mode, turning and/or pushing the first operation means allows a predetermined process to be performed for the textual information displayed on the display means, and operating the second operation means in the second display mode causes the second display mode to shift back to the first display mode, and operating the second operation means in the third display mode and the fourth display mode causes the third display mode and the fourth display mode to shift back to the second display mode.

2. The electronic apparatus as claimed in claim 1, wherein the second operation means comprises an escape key switch.

3. An electronic apparatus comprising:

a first directional key, a second directional key, an operation key, display means for displaying character-strings, and control means responsive to said first directional key, said second directional key, and said operation key for controlling said display means, wherein in a first display mode, one line each of at least one character string is displayed in a list on the display means, turning one of the first directional key and the second directional key causes a cursor set on a character string in the list of at least one character string to move in one of a first direction and a second direction or causes the list of at least one character string to scroll in one of the first direction and the second direction, and pushing the operation key in the first display mode causes a mode-shift to a second display mode, wherein in the second display mode, the display means displays one screen of at least one character string on which the cursor was set when the operation key was pushed in the first display mode, operating one of the first directional key and the second directional key causes contents of display on the display means to scroll vertically in one of the first direction and the second direction, and operating the operation key in the second display mode causes a mode-shift to a third display mode, and in the third display mode, operating one of the first directional key and the second directional key causes the contents of display on the display means to shift to the character-string preceding or following the current character-string in units of one screen for each operation, wherein when the operation key is operated in the second display mode in a different manner from that in which the operation key was operated for performing the mode-shift from the second display mode to the third display mode, the mode shifts to a fourth display mode, and wherein the operation key comprises a first operation key and a second operation key, wherein operating the second operation key in the second display mode causes the second display mode to shift back to the first display mode, and operating the second operation key in one of the third display mode and the fourth display mode causes a present mode to shift back to the second display mode.

\* \* \* \* \*